(12) United States Patent
Wadensten (10) Patent No.: US 6,349,817 B1
(45) Date of Patent: Feb. 26, 2002

(54) MOUNTING BRACKET FOR GENERATING LINEAR IMPELLING PULSES FROM A ROTARY VIBRATOR MOUNTED THEREON

(76) Inventor: Theodore S. Wadensten, P.O. Box 8, Wyoming, RI (US) 02898

( * ) Notice: Subject to any disclaimer, the term of this patent is extended or adjusted under 35 U.S.C. 154(b) by 16 days.

(21) Appl. No.: 09/605,235

(22) Filed: Jun. 28, 2000

(51) Int. Cl.[7] .............................................. B65G 27/20
(52) U.S. Cl. ........................ 198/770; 198/763; 198/771
(58) Field of Search ............................. 198/752.1, 758, 198/759, 763, 766, 770, 771

(56) References Cited

U.S. PATENT DOCUMENTS

| | | | | |
|---|---|---|---|---|
| 3,834,523 A | * | 9/1974 | Evans | ......................... 198/763 |
| 5,460,259 A | * | 10/1995 | Burgess, Jr. | ............. 198/763 X |
| 5,967,294 A | * | 10/1999 | Patterson et al. | ............ 198/763 |
| 6,279,731 B1 | * | 8/2001 | Anderson | .................... 198/763 |

* cited by examiner

Primary Examiner—James R. Bidwell
(74) Attorney, Agent, or Firm—Patrick J. Pinto (57) ABSTRACT

A mounting bracket assembly for connecting a single rotary vibrator to a vibratory feeding device that includes an elastomer spacer member retained and sandwiched between a base plate and a vibrator mounting plate. The mounting plate assembly converts sinusoidal forces exerted by the rotary vibrator to predominantly linear impelling pulses that are in a direction that is perpendicular to a first surface of the base plate. The base plate may be attached to the vibratory feeding device directly or by an adjustable pivot assembly. The direction of movement of items carried on a surface of the vibratory feeding device is directly related to the direction of rotation of the rotary vibrator. The mounting bracket assembly may also include at least one isolation member for minimizing contact of the vibrator mounting plate and retaining members used therewith.

24 Claims, 7 Drawing Sheets

MOUNTING BRACKET FOR GENERATING LINEAR IMPELLING PULSES FROM A ROTARY VIBRATOR MOUNTED THEREON

CROSS REFERENCE TO RELATED APPLICATION

Not Applicable

STATEMENT REGARDING FEDERALLY SPONSORED RESEARCH OR DEVELOPMENT

Not Applicable

BACKGROUND OF THE INVENTION

1. Field of the Invention

With regard to the classification of art, this invention is believed to be found in the general class pertaining to supports or brackets for attaching or connecting a rotary vibrator to a vibratory apparatus (i.e., vibratory feeder or screen, or conveyor) and more particularly to intermediate supports or brackets that convert sinusoidal forces to substantially linear impelling pulses for moving articles carried by the vibratory apparatus in a predetermined direction.

2. Description of Related Art Including Information Disclosed Under 37 CFR 1.97 and 1.98.

Figure 1:
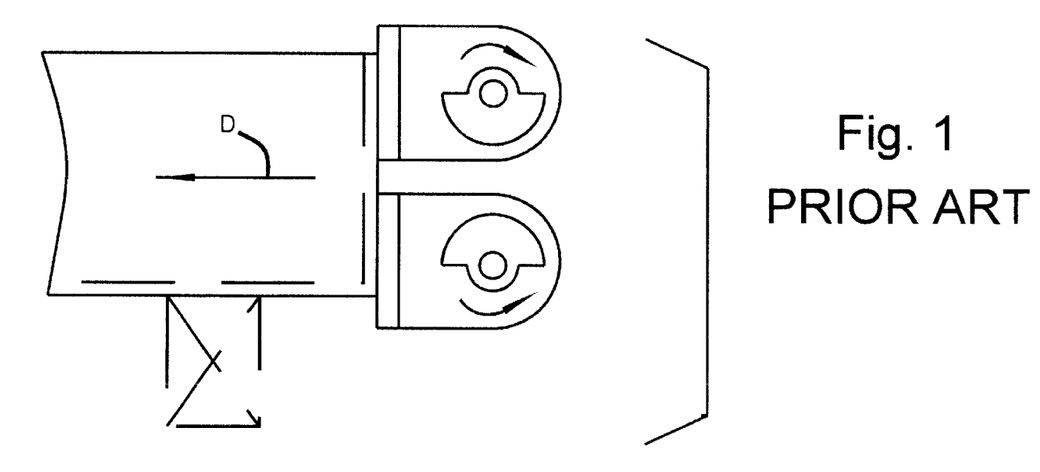
FIG. 1 represents a diagrammatic representation of the known prior art. This view is labeled PRIOR ART.

It is known in the art to advance articles on vibratory feeders, tables and screens. Usually linear vibrating devices are employed in such an application. Some examples of linear vibrating devices are electromagnetic linear vibrators and pneumatically operated piston vibrators. It is also a well known fact in the art that two rotary vibrators that have their shafts rotated in opposite directions while simultaneously being mounted in a parallel relationship will provide a linear-like output, in the direction of arrow "D" for advancing articles along vibratory feeders, tables or screens. This arrangement is depicted in FIG. 1 and identified as PRIOR ART. The disadvantages of using two rotary vibrators are: a) cost; b) matching the two vibrators so that synchronization will occur when the vibrators are operating; c) power consumption requirements for operating two independently driven devices.

It has been determined that there is still a need for feeding or conveying articles on a vibratory apparatus (i.e., vibratory feeders, conveyors, sorters, screens and the like) by means of a single rotary vibrator. Within the context of this application a single rotary vibrator has a single shaft having at least one eccentric weight mounted thereon for producing a predetermined sinusoidal output force or wave. The single rotary vibratory may be driven by an electric, hydraulic or pneumatic motor as well as by a turbine drive.

The present invention solves the identified need by connecting the single rotary vibrator to its associated vibratory apparatus (i.e., feeder, table or screen) by way of a mounting bracket that converts the sinusoidal wave output at the rotary vibrator to substantially linear-like impelling momentary forces or pulses at a base plate of the mounting bracket. These momentary forces or pulses are emitted in a direction that is perpendicular to a major surface of the mounting bracket assembly for advancing products carried by the vibratory apparatus connected thereto.

SUMMARY OF THE INVENTION

The present invention may be briefly described with respect to its objects. It is an object of the present invention to provide and it does provide a mounting bracket assembly for converting sinusoidal forces or waves exerted by a single rotary vibrator mounted to one side thereof to linear-like pulses or momentary pulses at an opposite side thereof.

The one embodiment of the present invention may be briefly described as: a mounting bracket assembly for connecting a rotary vibrator to a vibratory feed conveyor including: A) a base plate having a first surface, a second surface, and a predetermined perimeter outline. B) a vibrator mounting plate having a first mounting surface, a interior surface and a selected peripheral outline; C) a spacer member being formed in a predetermined configuration, the spacer member being made of an elastomer material and having a predetermined thickness. The perimeter outline of the base plate and peripheral outline of the vibrator mounting plate are aligned in a selected relationship, and the spacer member being retained and sandwiched between the second surface of the base plate and the interior surface so that sinusoidal vibratory forces developed by rotary operation of the rotary vibrator in a selected direction are converted to impelling pulses at the first surface of the base plate. The impelling pulses are exerted in a predetermined linear direction that is perpendicular to the first surface, thereby applying the impelling pulses to the vibratory feeding device connected to the first surface of the base plate for advancing items thereon.

A second embodiment of the present invention may also include an isolation member or pad that is retained on the first mounting surface of the vibrator mounting plate for isolating the vibrator mounting plate from each of a plurality of retaining members that are used for the retaining the spacer member between the base plate and the vibratory mounting plate.

The mounting bracket assembly of the present invention may also include an adjustable clevis arrangement for pivotally attaching the mounting bracket assembly to its associated vibratory feeder, table or screen for altering the relative position of the rotary vibrator with the respect to vibratory feeder, table or screen and thereby altering the feed pattern of items advancing thereon.

In addition to the above summary, the following disclosure is intended to be detailed to insure adequacy and aid in the understanding of the invention. However, this disclosure, showing particular embodiments of the invention, is not intended to describe each new inventive concept that may arise. These specific embodiments have been chosen to show at least one preferred or best mode for a mounting plate assembly of the present invention. These specific embodiments, as shown in the accompanying drawings, may also include diagrammatic symbols or drawings for the purpose of illustration and understanding.

In the following description and in the appended claims, various details are identified by specific names for convenience. These names are intended to be generic in their application while differentiating between the various details. The corresponding reference numbers refer to like members throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Figure 2:
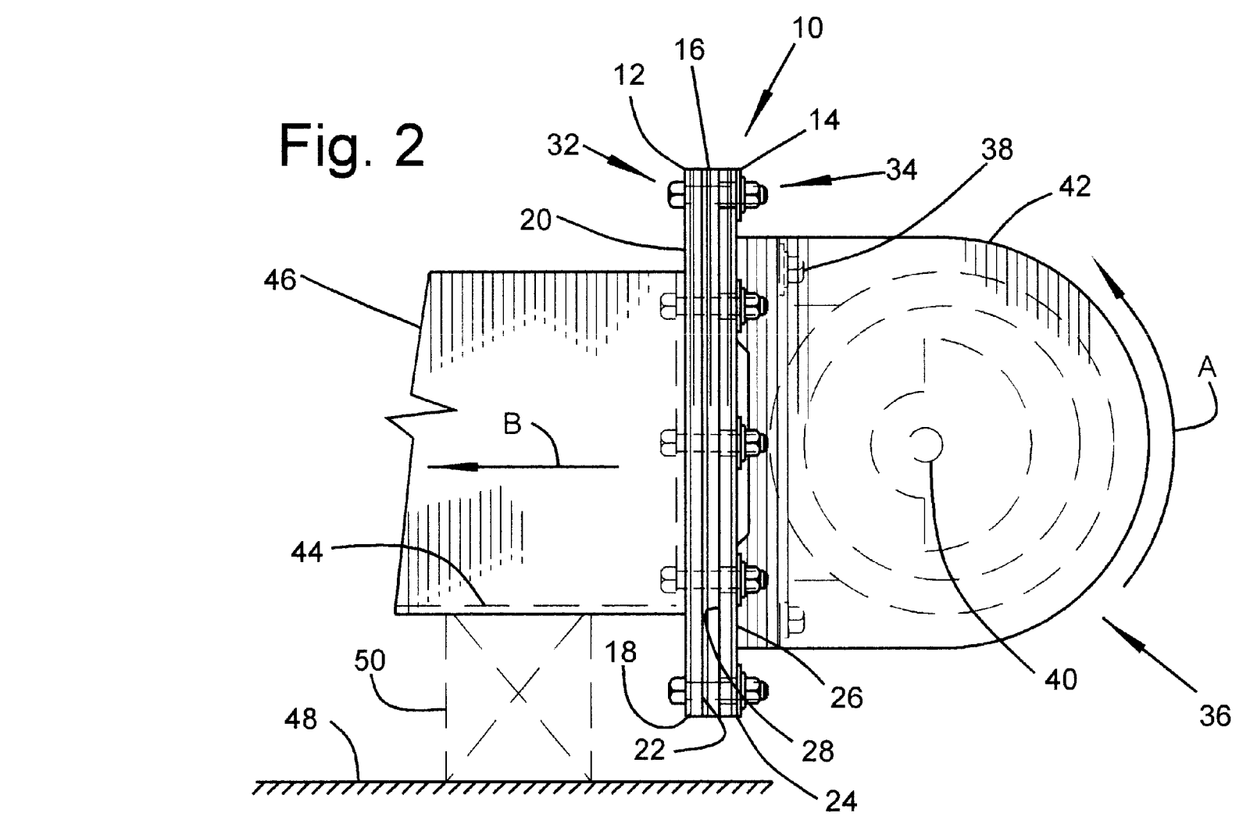
FIG. 2 represents a side elevation of one embodiment of the mounting bracket assembly of the present invention.
Figure 3:
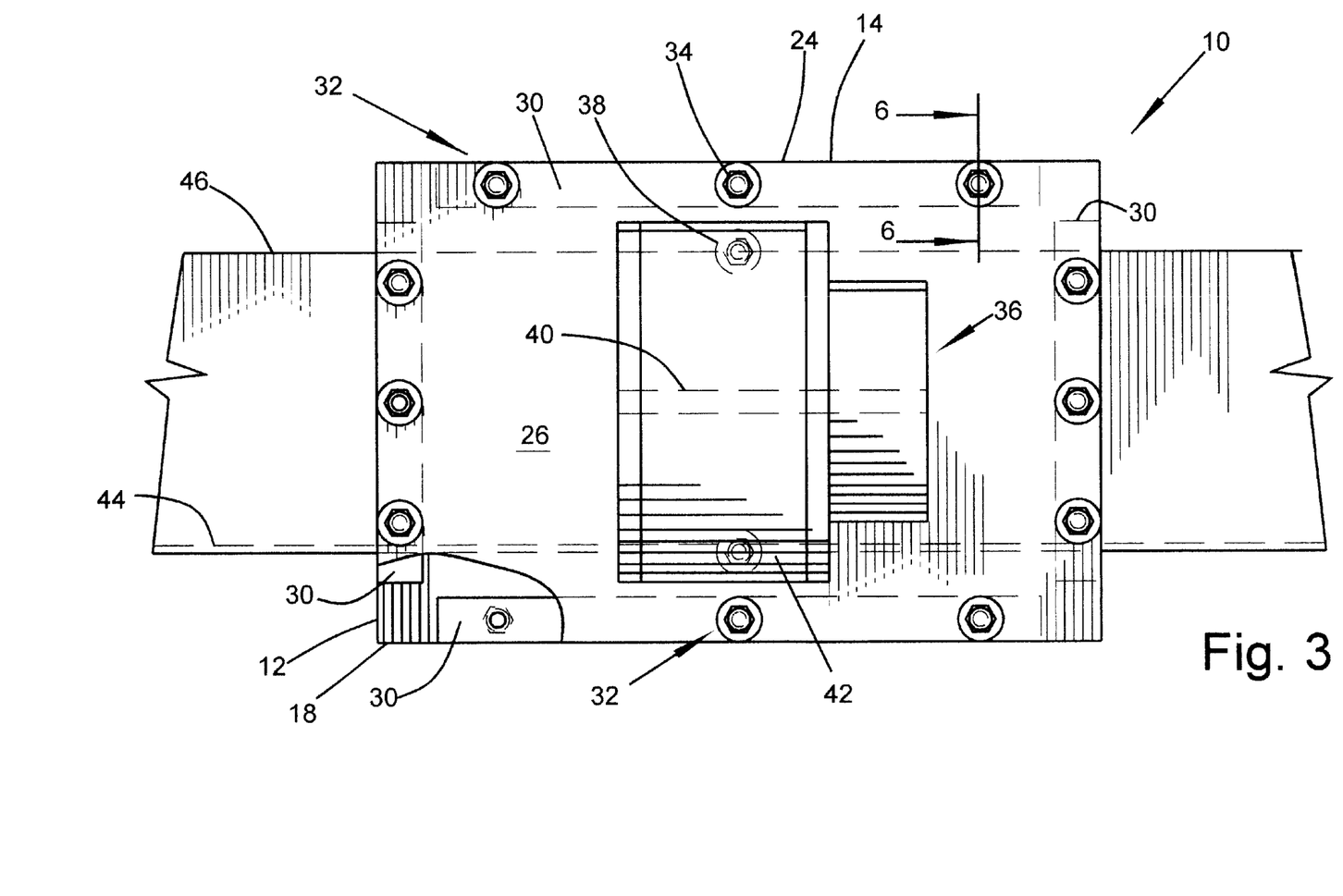
FIG. 3 represents an end elevation of the mounting bracket assembly. One corner of the vibrator mounting plate has been broken away to reveal a base plate.
Figure 6:
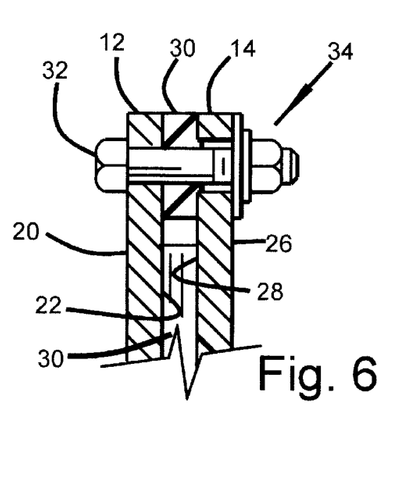
FIG. 6 represents an isolated side elevation of an alternate spacer member in the form of elongated strips. This view is taken along line 6—6 of FIG. 3.

Referring first to FIGS. 2, 3, and 6, a first and basic embodiment of a mounting bracket assembly is generally identified as 10. This mounting bracket assembly 10 includes a base plate 12, a vibrator mounting plate 14 and a spacer member 16. The base plate 12 is formed of a suitable material, such as a metal plate or bar. The base plate 12 further includes a perimeter outline 18, a first surface 20, and a second surface 22. The spacer member 16 is preferably made of an elastomer material such as rubber, urethane and the like. The vibrator mounting plate 14 is preferably formed of a suitable material, such as a metal plate or bar. The vibrator mounting plate 14 further includes a peripheral outline 24, a first mounting surface 26 and an interior surface 28.

In the basic embodiment, the spacer member 16 is formed as a sheet of an elastomer material that is about the same size and shape as the base plate 12 and the vibrator mounting plate 14. It is anticipated that the spacer member 16 may be permanently sandwiched between the base plate 12 and the vibrator mounting plate 14 by molding, vulcanizing or using adhesives. Alternatively, the spacer member 16 may be made of individual elongated strips 30 of the elastomer material. One non-limiting example of the individual elongated strips 30 is shown in dashed outline in FIG. 3. Of course the individual strips 30 should have like properties (i.e. thickness, Durometer or hardness and the like). It is to be noted that the retention of the components of the mounting bracket assembly 10 should be sufficient for maintaining the relative position of the base plate 12 with respect to the vibrator mounting plate 14. It is preferred that the spacer member 16 is removably sandwiched and retained between the second surface 22 of the base plate 12 and the interior surface 28 of the vibrator mounting plate 14 by a plurality of retaining members 32, such as threaded fasteners and the like. It is preferred that each of the retaining members 32 include a locking device 34 that resists loosening of the retaining members 32 during operation of a rotary vibrator 36 mounted to the first mounting surface 26 of the vibrator mounting plate 14. Some non-limiting examples of locking devices are lock nuts, lock washers, nylon inserts, thread locking compounds and the like.

The mounting base of the rotary vibrator 36 is removably attached to the vibrator mounting plate 14 by way of a plurality of threaded fasteners 38 in a conventional manner for ease of service or replacement thereof. The holes in the mounting base of the rotary vibrator 36 should be positioned at a central location of the vibrator mounting plate 14. It is also preferred that the threaded fasteners 38 be of the self-locking type for resisting loosening during selective operation of the rotary vibrator 36. A shaft 40, shown in dashed outline, that carries an eccentric weight housed interior of the vibrator housing 42 should be aligned so that its elongated axis is substantially parallel to a surface 44 of a vibratory apparatus 46 (i.e., feeder, table, or screen). This arrangement may be more clearly seen in FIG. 3. Referring again and in particular to FIG. 2, the vibratory apparatus 46 is supported on a base or frame 48 by a plurality of conventional vibration isolators 50 (i.e., compression springs, leaf springs, rubber pads, or the like).

The following is one non-limiting example of the present invention for use with a foot mounted rotary vibrator 36 that develops an impact force of 260 N (60 Lbs). A mount bracket assembly 10 includes a 6.3 mm (0.250 in.) thick base plate 12 that is directly attached to a vibratory apparatus 46 by a suitable means such as threaded fasteners 32 and/or welding. The rotary vibratory 36 is removably attached to the mounting surface 26 of the vibrator mounting plate 14 at a central position. In this example, the vibrator mounting plate 14 is similar in size to the base plate 12 and has its peripheral outline 24 aligned with the perimeter outline 18 of the base plate 12. The rotary vibrator 36 has a mounting footprint or pad in the neighborhood of 15.2 cm (6 in.)×7.8 cm (5 in.). It has been found that a 20.3 cm (8 in.)×30.5 cm (12 in.) rectangular base plate 12 provides satisfactory results when combined with a spacer member 16 that is made of a plurality of individual elongated strips 30. Each elongated strips 30 is made of a 60 Durometer neoprene rubber and is 6 mm (0.250 in.) thick and 18 mm (0.750 in.) wide. It has been found that elongated strips 30 that are 5 cm (2 in) shorter than the sides of the base plate 12 and vibratory plate 14 have provided the desired conversion of sinusoidal output at the rotary vibrator 36 to linear-like impelling pulses at the vibratory apparatus 46. The use of the elongated strips 30 reduces the weight of the bracket while providing an economical use of the rubber. It is preferred that the elongated strips 30 be centrally located along the edges of the plates 12 and 14. It has been found that when the rotation of the rotary vibrator 36 is in a counter-clockwise direction "A", seen in FIG. 2 the impelling pulses are in a leftward direction as depicted by arrow "B" thereby moving articles on the surface 44 from right to left. The direction of the impelling pulses may be selectively reversed by changing the rotation of the rotary vibrator 36 to a clock-wise direction thereby moving articles on the surface 44 from left to right.

Figure 4:
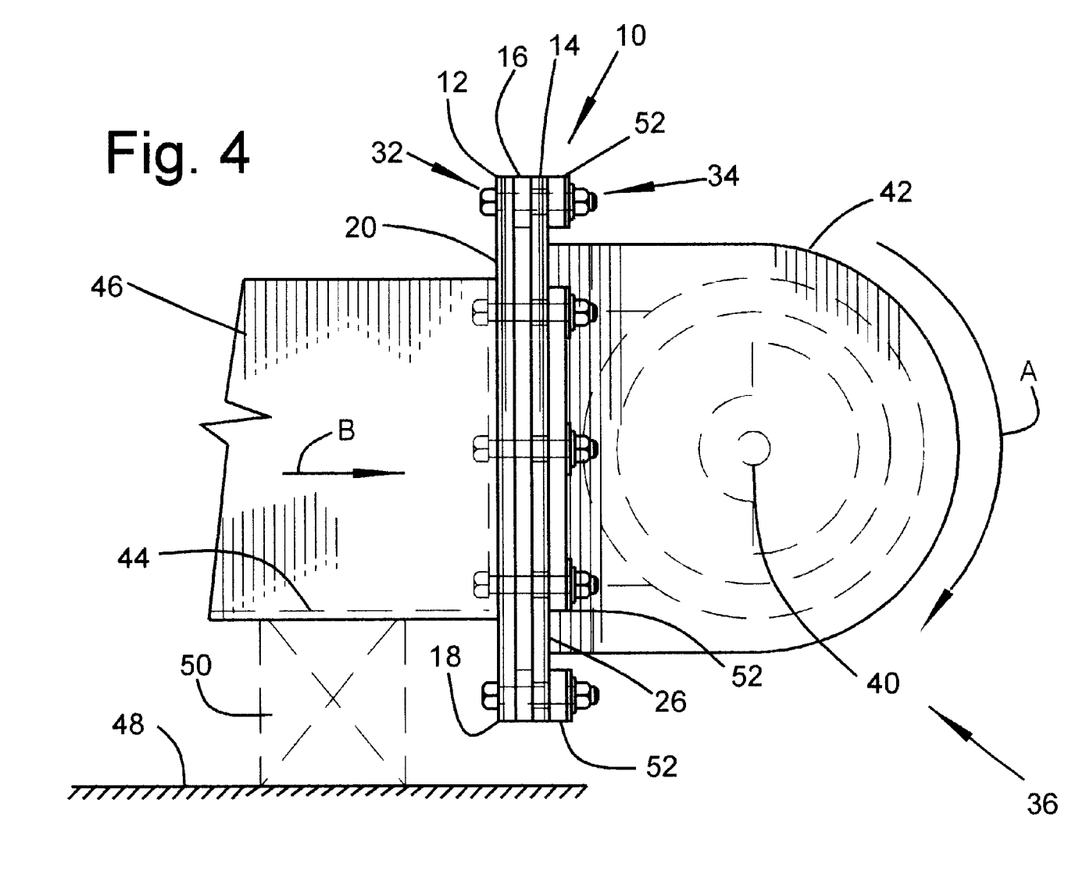
FIG. 4 represents a side elevation of a second embodiment of the present invention.
Figure 5:
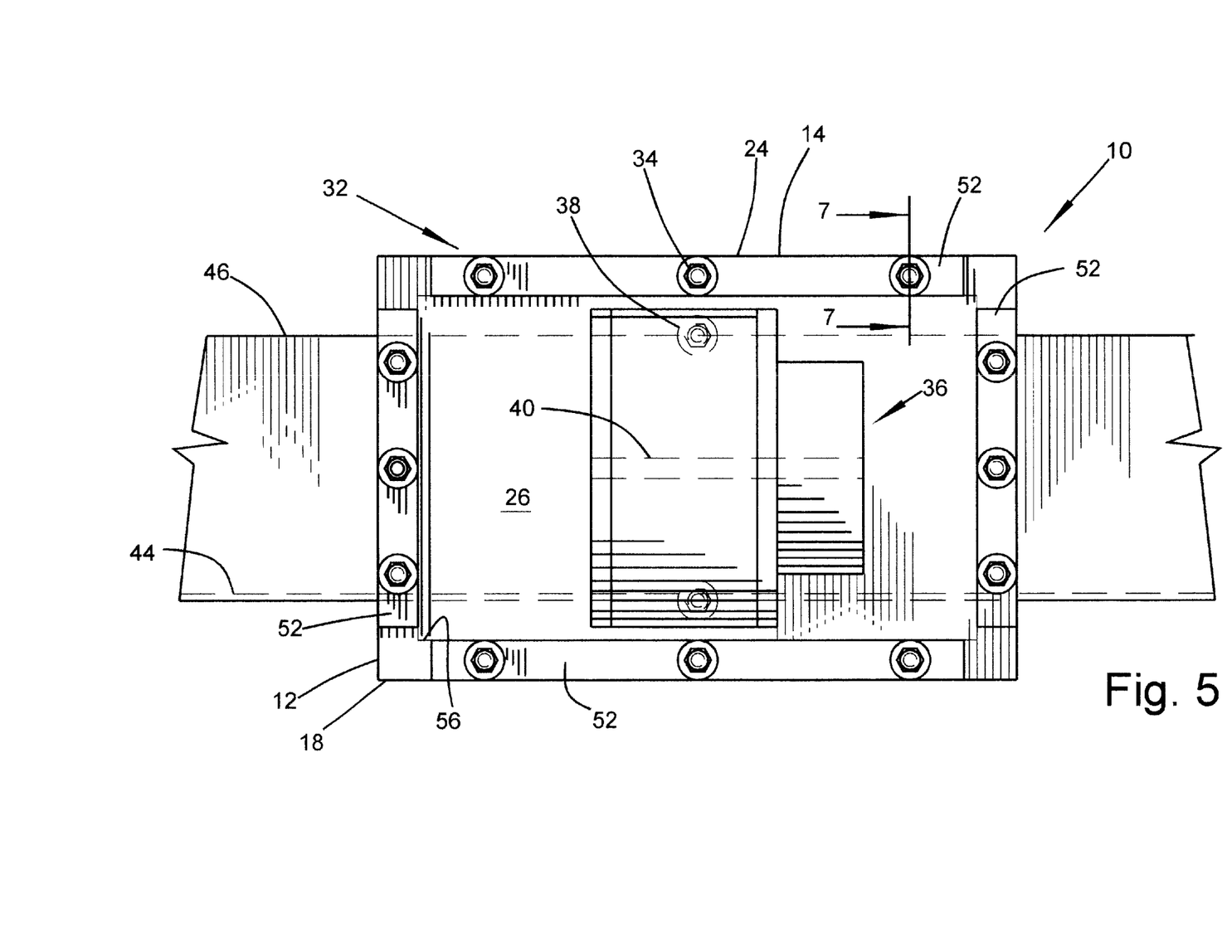
FIG. 5 represents an end elevation of the second embodiment of the mounting bracket assembly.
Figure 7:
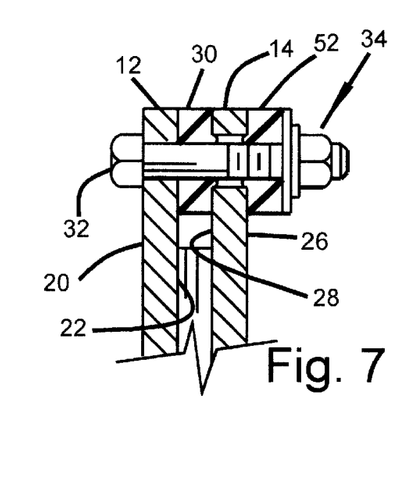
FIG. 7 represents an isolated enlarged cross-sectional view, in section, of one arrangement for the second embodiment. This view is taken along line 7—7 of FIG. 5.
Figure 8:
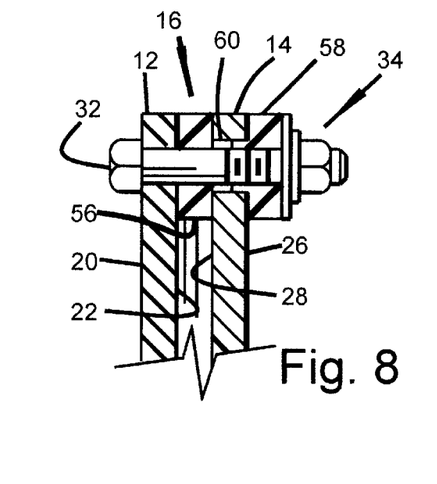
FIG. 8 represents an isolated enlarged cross-sectional view, in section, of an alternate arrangement for the second embodiment. This view is taken in the same direction as FIG. 7.

A second embodiment of the present invention is shown in FIGS. 4, 5, and 7. The second embodiment is similar to the construction of the first embodiment described above with the exception of the addition of an isolation member 52 under the enlarged portion (i.e., head or nut) of each retaining member 32. The isolation member 52 is also an elastomer material having properties similar to those of the spacer member 16 or elongated strips 30. This second embodiment also shows another alternate configuration for the spacer member 16. In this alternate configuration, the spacer member 16 is made from a frame-like piece of elastomer material having a windowed interior portion 56. It is to be noted, that the isolation member 52 and the spacer member 16 may be made exactly alike therefore making them interchangeable as long as there is a windowed portion for allowing clearance around the mounting base of the rotary vibrator 36. It is to be also noted that the compression of the spacer member 16 and the isolation member 52 must be sufficient to ensure that the retaining members 32 do not hit the side of the clearance holes in the vibrator mounting plate 14. Adequate compression of the spacer member 16 and the isolation member 52 causes the elastomer material to squeeze into the opposing ends of the clearance holes, as seen in FIG. 7. In this second embodiment, the feeding speed of the articles on the surface 44 is greater than that of first embodiment when tested under similar conditions and feeding like materials on the vibratory apparatus 46. It is to be additionally noted that an alternate isolation member 58 may be substituted for the elongated isolation member 52 or a frame-like isolation member having an interior portion 56. This alternate isolation member 58 may be in the form of a flanged elastomer bushing that is seated in the clearance hole 60 in the vibrator mounting plate 14. Each elastomer bushing, seen more clearly in FIG. 8, is individually compressed by the enlarged diameter portion of its' associated retaining member 32 while simultaneously maintaining the desired compression of the spacer member 16. As in the first embodiment, described above, the direction of the linear-like impelling pulses is directly related to the direction of rotation of the eccentric weight in the rotary vibrator 36. It is believed that the flange bushing may be substituted for the spacer member in some applications.

Figure 9:
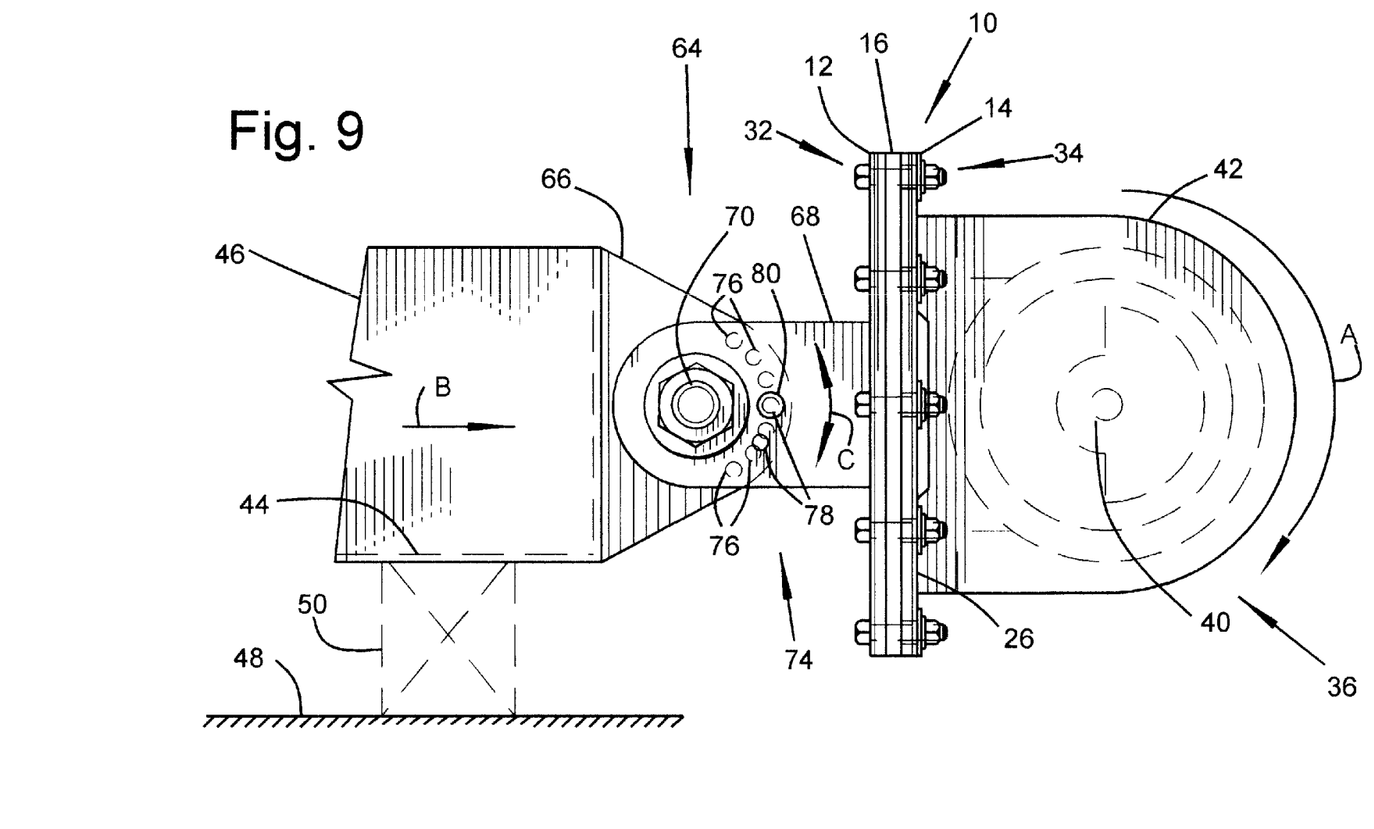
FIG. 9 represents a side elevation of a third embodiment of the present invention. This view is taken in the same direction as FIGS. 2 and 4. This view is showing an adjustable pivot mounting arrangement for connecting the mounting bracket assembly to a vibrating conveyor apparatus.
Figure 10:
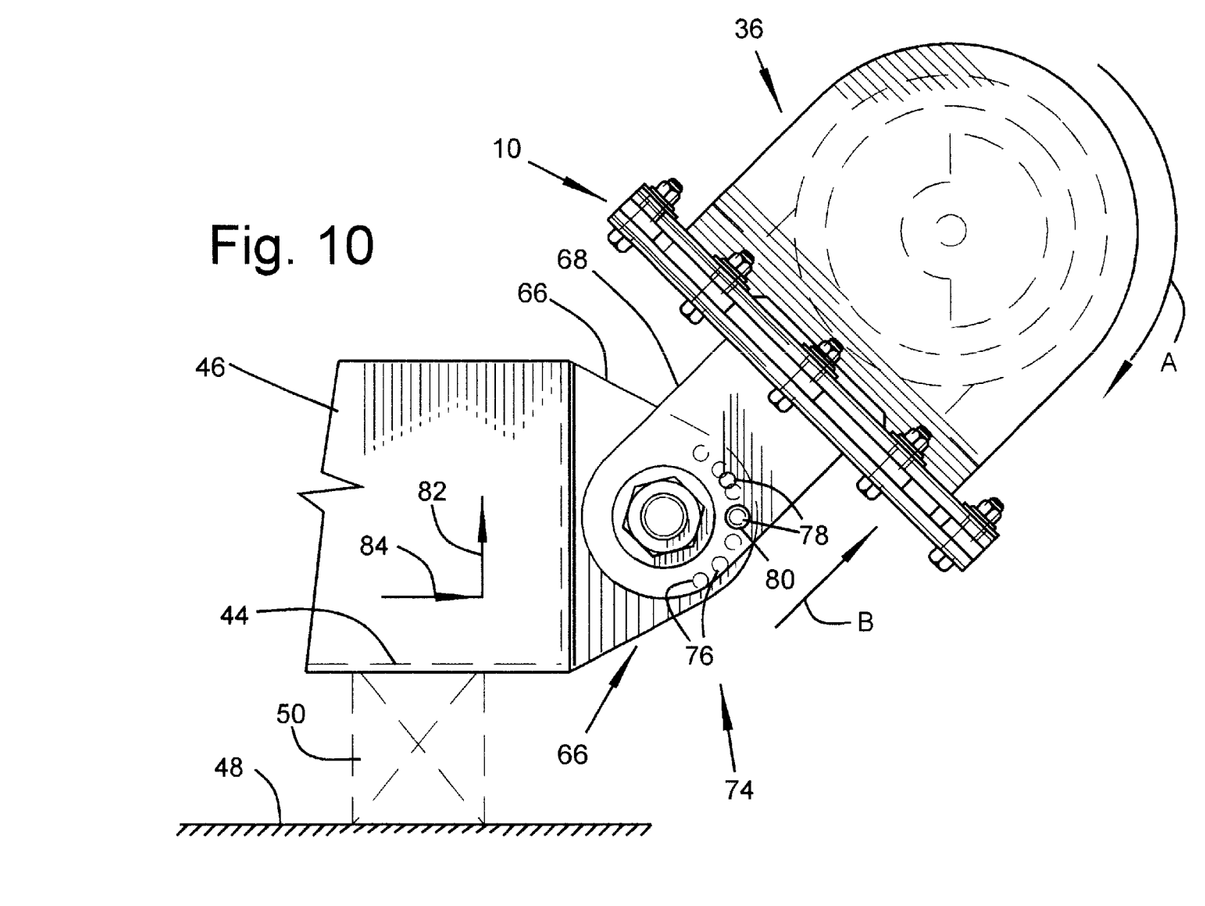
FIG. 10 represents a side elevation of the third embodiment of FIG. 9 and showing the mounting bracket at one of the adjustable positions.

A third embodiment of the present invention is shown in FIGS. 9 and 10. This third embodiment further includes an adjustable pivot assembly 64 for pivotally attaching the mounting bracket assembly 10 to the vibratory apparatus 46. One nonlimiting example of an adjustable pivot assembly 64 is a clevis-like arrangement having a first half 66 and a second half 68 and a pivot pin 70. The first half 66 is attached to the vibratory apparatus 46. The second half 68 is attached to the base plate 12. The axis of the pivot pin 70 is substantially parallel to the elongated axis of the shaft 40 of the rotary vibrator 36 and the surface 44 to within reasonable tolerances. The adjustable pivot assembly 64 allows the angular positioning of the rotary vibratory 36 along the path of arrow C. This adjustable pivot assembly 64 must be capable of being locked at a selected angular position. One non-limiting example of a locking arrangement is a threaded bolt and nut assembly, that, when tightened acts simultaneously as a friction clamp and the pivot pin 70. A non-limiting example of a second locking arrangement 74 is a plurality of apertures 76 that are located on the first half 66 and are arrayed in an arc about the pivot pin 70. The apertures are aligned with at least one through aperture 78 on the second half 68. A keeper pin 80 is inserted in apertures 76 and 78 and retained therein by a suitable means such as a retaining ring, cotter pin, detent, threaded fastener or the like. It is to be noted that a combination of the second locking arrangement 74 and the clamping action of the threaded bolt and nut assembly may be used. FIG. 9 shows the rotary vibrator 36 in a position similar to the first embodiment and the second embodiment discussed above. FIG. 10 shows the rotary vibrator 36 moved or adjusted to an alternate position for applying the linear-like impelling pulses to the vibratory apparatus 46 thereby effecting the feeding of articles thereon by increasing a vertical component or amplitude 82 of the feeding force while decreasing the horizontal component 84 of the feeding force. As in the first embodiment and the second embodiment, described above, the direction of the linear-like impelling pulses is directly related to the direction of rotation of the eccentric weight in the rotary vibrator 36. It has been found that the angular position of the rotary vibrator 36 may be adjusted either clock-wise or counter clock-wise from the position shown in FIG. 9 and have similar feeding and amplitude characteristics for equal amounts of positive or negative angular displacement of the rotary vibrator 36 with respect to the surface 44.

It is to be noted that the shape of the base plate 12, the vibrator mounting plate 14 and the spacer member 16 have been shown as rectangular and equal in dimensions. However in some applications of the present invention it may be necessary that the plates may be with differing dimensions. It is believed that other convenient geometrical shapes may be used for components of the mounting bracket assembly 10 while providing the linear like impelling pulses from a single rotary vibrator mounted thereon.

Directional terms such as "front", "back", "in", "out", "downward", "upper", "lower", "leftward", "rightward" and the like may have been used in the description. These terms are applicable to the embodiments shown and described in conjunction with the drawings. These terms are merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. A mounting bracket assembly for connecting a rotary vibrator to a vibratory feeding device including:
   a) a base plate having a first surface, a second surface, and a predetermined thickness;
   b) a vibrator mounting plate having a first mounting surface, an interior surface and a predetermined thickness;
   c) a spacer member being retained and sandwiched between the second surface and an interior surface, said spacer member being made of an elastomer material and having a predetermined thickness; and
       wherein the base plate and the vibrator mounting plate are aligned in a selected relationship, the rotary vibrator being mounted to the first mounting surface so that sinusoidal vibratory forces developed by rotary operation of the rotary vibrator in a selected rotary direction are converted to impelling pulses at the first surface of the base plate, the impelling pulses are exerted in a predetermined linear direction, the predetermined linear direction being perpendicular to said first surface, and thereby applying said impelling pulses to the vibratory feeding device connected to said first surface of said base plate for advancing items thereon.

2. A mounting bracket assembly as recited in claim 1 wherein the spacer member further includes a plurality of elongated strips having a predetermined width, and each of the elongated strips being compressively retained at selected positions between the base plate and the vibrator mounting plate by retaining members.

3. A mounting bracket assembly as recited in claim 1 wherein the spacer member is formed as a unitary piece of material, said spacer member having the predetermined thickness and having an interior portion, the interior portion being of a predetermined size for forming a frame-like spacer member that is compressively retained at selected positions between the base plate and the vibrator mounting plate by retaining members.

4. A mounting bracket assembly as recited in claim 1 wherein the first surface of the base plate is directly attached to the vibratory feeding device so that an axis of a shaft of the rotary vibrator is positioned in parallel relationship with a feeding surface of the vibratory feeding device.

5. A mounting bracket assembly as recited in claim 2 wherein the first surface of the base plate is directly attached to the vibratory feeding device so that an axis of a shaft of the rotary vibrator is positioned in parallel relationship with a feeding surface of the vibratory feeding device.

6. A mounting bracket assembly as recited in claim 3 wherein the first surface of the base plate is directly attached to the vibratory feeding device so that an axis of a shaft of the rotary vibrator is positioned in parallel relationship with a feeding surface of the vibratory feeding device.

7. A mounting bracket assembly as recited in claim 1 which further includes at least one isolation member, each isolation member be selectively positioned on the first mounting surface of the vibrator mounting plate and retained thereon by retaining members for maintaining a selected clearance between portions of the retaining members and the vibrator mounting plate in a close proximal relationship absent contact.

8. A mounting bracket assembly as recited in claim 2 which further includes at least one isolation member, each isolation member be selectively positioned on the first mounting surface of the vibrator mounting plate and retained thereon by the retaining members for maintaining a selected clearance between portions of the retaining members and the vibrator mounting plate in a close proximal relationship absent contact.

9. A mounting bracket assembly as recited in claim 3 which further includes at least one isolation member, each isolation member be selectively positioned on the first mounting surface of the vibrator mounting plate and retained thereon by the retaining members for maintaining a selected clearance between portions of the retaining members and the vibrator mounting plate in a close proximal relationship absent contact.

10. A mounting bracket assembly as recited in claim 4 which further includes at least one isolation member, each isolation member be selectively positioned on the first mounting surface of the vibrator mounting plate and retained thereon by the retaining members for maintaining a selected clearance between portions of the retaining members and the vibrator mounting plate in a close proximal relationship absent contact.

11. A mounting bracket assembly as recited in claim 5 which further includes at least one isolation member, each isolation member be selectively positioned on the first mounting surface of the vibrator mounting plate and retained thereon by the retaining members for maintaining a selected clearance between portions of the retaining members and the vibrator mounting plate in a close proximal relationship absent contact.

12. A mounting bracket assembly as recited in claim 6 which further includes at least one isolation member, each isolation member be selectively positioned on the first mounting surface of the vibrator mounting plate and retained thereon by the retaining members for maintaining a selected clearance between portions of the retaining members and the vibrator mounting plate in a close proximal relationship.

13. A mounting bracket assembly for connecting a rotary vibrator to a vibratory feeding device including:
   a) a base plate having a first surface, a second surface, and a predetermined thickness;
   b) a vibrator mounting plate having a first mounting surface, an interior surface and a predetermined thickness;
   c) a spacer member being retained and sandwiched between the second surface and an interior surface, said spacer member being made of an elastomer material and having a predetermined thickness;
   d) an adjustable pivot assembly that is positioned intermediate the first surface of the base plate and the vibrating feeding device, the adjustable pivot assembly further including a locking device for maintaining a selected angular relationship between the base plate and the vibrating feeding device; and
       wherein the base plate and the vibrator mounting plate are aligned in a selected relationship, the rotary vibrator being mounted to the first mounting surface so that sinusoidal vibratory forces developed by rotary operation of the rotary vibrator in a selected rotary direction are converted to impelling pulses at the first surface of the base plate, the impelling pulses are exerted in a predetermined linear direction, the predetermined linear direction being perpendicular to said first surface, and thereby applying said impelling pulses to the vibratory feeding device by way of the of the adjustable pivot assembly and at the selected angular relationship for advancing items at a selected rate on a feeding surface of the vibratory feeding device.

14. A mounting bracket assembly as recited in claim 13 wherein the spacer member further includes a plurality of elongated strips having a predetermined width, and each of the elongated strips being compressively retained at selected positions between the base plate and the vibrator mounting plate by retaining members.

15. A mounting bracket assembly as recited in claim 13 wherein the spacer member is formed as a unitary piece of material, said spacer member having the predetermined thickness and having an interior portion, the interior portion being of a predetermined size for forming a frame-like spacer member that is compressively retained at selected positions between the base plate and the vibrator mounting plate by retaining members.

16. A mounting bracket assembly as recited in claim 13 which further includes at least one isolation member, each isolation member be selectively positioned on the first mounting surface of the vibrator mounting plate and retained thereon by the retaining members for maintaining a selected clearance between portions of the retaining members and the vibrator mounting plate in a close proximal relationship absent contact.

17. A mounting bracket assembly as recited in claim 14 which further includes at least one isolation member, each isolation member be selectively positioned on the first mounting surface of the vibrator mounting plate and retained thereon by retaining members for maintaining a selected clearance between portions of the retaining members and the vibrator mounting plate in a close proximal relationship absent contact.

18. A mounting bracket assembly as recited in claim 15 which further includes at least one isolation member, each isolation member be selectively positioned on the first mounting surface of the vibrator mounting plate and retained thereon by the retaining members for maintaining a selected clearance between portions of the retaining members and the vibrator mounting plate in a close proximal relationship absent contact.

19. A mounting bracket assembly as recited in claim 13 wherein an axis of the adjustable pivot assembly is selectively aligned in a parallel relationship with an elongated axis of a shaft of the rotary vibrator.

20. A mounting bracket assembly as recited in claim 14 wherein an axis of the adjustable pivot assembly is selectively aligned in a parallel relationship with an elongated axis of a shaft of the rotary vibrator.

21. A mounting bracket assembly as recited in claim 15 wherein an axis of the adjustable pivot assembly is selectively aligned in a parallel relationship with an elongated axis of a shaft of the rotary vibrator.

22. A mounting bracket assembly as recited in claim 16 wherein an axis of the adjustable pivot assembly is selectively aligned in a parallel relationship with an elongated axis of a shaft of the rotary vibrator.

23. A mounting bracket assembly as recited in claim 17 wherein an axis of the adjustable pivot assembly is selectively aligned in a parallel relationship with an elongated axis of a shaft of the rotary vibrator.

24. A mounting bracket assembly as recited in claim 18 wherein an axis of the adjustable pivot assembly is selectively aligned in a parallel relationship with an elongated axis of a shaft of the rotary vibrator.

* * * * *